United States Patent Office 3,285,996
Patented Nov. 15, 1966

3,285,996
POLYOLEFIN GRAFT COPOLYMER PROCESSING
Roland E. Gunderman, Clare, Irvin B. Kritzman, Kawkawlin, and James A. Moffitt, Midland, Mich., assignors to The Dow Chemical Company, Midland, Mich., a corporation of Delaware
No Drawing. Filed Dec. 26, 1962, Ser. No. 247,338
5 Claims. (Cl. 260—878)

This invention relates to polyolefin graft polymer processing. More particularly, it relates to an improved method of preparing polyolefin graft polymers in particulate granular form.

By the term "polyolefin" is meant the synthetic resinous polymers and copolymers of monoolefinic-non-aromatic aliphatic hydrocarbons having from 2 to 6 carbon atoms in the molecule typical of such materials as polyethylene, polypropylene and the resinous copolymers thereof. The polyolefin graft copolymers are derived from grafting another monomeric material onto a polyolefin substrate.

Frequently such polyolefin graft copolymers are prepared by a solution technique, i.e., they are polymerized or treated in an organic material which is a solvent or a partial solvent for the graft copolymer. Typical of the solvents which are utilized in commercial practice are toluene, xylene, benzene, perchloroethylene, carbon tetrachloride, pentane, hexane, heptane and similar hydrocarbons. Oftentimes, such organic solvents comprise a single compound or material and occasionally mixtures thereof are employed depending on the particular characteristics which are desired in the product and/or the convenience of processing. Frequently, more difficulty is encountered in recovering the polymeric material from the organic solvent in a desirable and convenient form. Generally, such solvents tend to adhere strongly to the polymeric mass and oftentimes tend to be occluded therein.

Oftentimes such polymeric materials are recovered from an organic solution or solvated dispersion by admixing the organic solvent polymeric carrying solution or dispersion with a quantity of water and steam distilling or directly distilling the organic material away from the water. This process then leaves a suspension of the polyolefin in water. The polymer is separated from the water and subsequently dried. Such techniques generally have not been highly satisfactory because of the involved heating and cooling steps utilized and the fact that generally the resinous polyolefin graft polymer is recovered in a form that is less than ideal for processing.

Beneficially, in most applications a relatively uniform size of particle is desired which does not contain large lumps or fine dust and oftentimes it is desirable to precisely control this particle size of the product in order that it may be utilized in its final application with a minimum inconvenience.

It is an object of this invention to provide an improved method for the recovery of polyolefin graft polymers from organic dispersions.

It is a further object of this invention to provide a method of recovering polyolefin graft polymers from organic solutions in a manner that will permit a ready control of particle size.

A more specific object of this invention is to provide an improved method for the recovery of graft polymers of polyethylene from organic solutions.

These benefits and other advantages in accordance with the invention are readily achieved by providing a dispersion of solvated polyolefin graft polymer in an organic medium. Admixing said dispersion with water, distilling from the water-organic-polymer dispersion, the organic solvent until the organic solvent is present in a ratio of from about 2 to 3 parts of solvent by weight per part of polyolefin, graft polymer, agitating the water-organic-polymer dispersion to disperse the organic material within the water in a substantially uniform manner wherein each of the droplets of the organic material contains a quantity of polyolefin that is desired in the final individual particle, distilling from the mixture the remaining portion of the organic material, maintaining agitation until the ratio of the organic material to the polyolefin is less than about 2 to 1.

Beneficially, in the practice of the present invention the organic solvents utilized are those which form azeotropes with water, if the boiling point of the solvent is above that of water, and that the organic solvent preferably shall be of the hydrophobic type such as toluene, xylene, benzene, perchloroethylene, carbon tetrachloride and aliphatic hydrocarbons.

The particular solvents employed are dependent on the characteristics of the polymeric material utilized. For example, with graft polymers of polyethylene, it is particularly advantageous to utilize an aromatic solvent such as toluene in order to achieve solution of the polymer. In order to promote solution of the polymer in the solvent temperatures about 110° centigrade are utilized. Oftentimes temperatures as high as 200° centigrade may be employed, however, most beneficially temperatures are in the range of 115° centigrade to about 140° centigrade. As these temperatures are above the boiling point of the toluene, it is necessary to utilize the closed pressure type vessels. When materials such as polypropylene graft polymers are employed frequently the aliphatic solvents are utilized such as pentane, hexane, heptane or mixtures thereof.

Beneficially, after the graft polymer has formed a solution or solvated dispersion the entire mass is added to a quantity of water, most beneficially the temperature of the water is adjusted in such a manner that the combination of the hot organic dispersion or solution and the water will result in a temperature at which the organic solvent material will distill from the mixture. For example, if a polyethylene graft copolymer is dissolved in hot toluene at a temperature of 130° centigrade, it is added to a quantity of water which has a temperature sufficiently below about 85° centigrade that the resulting mixture will achieve a temperature of about 85° centigrade which is the distillation temperature under atmospheric pressure of the water-toluene azeotrope.

Generally, it is beneficial to employ only sufficient water to provide a continuous water phase when the volume of organic material within the dispersion is reduced sufficiently to permit solvent to polymer ratio of about 3 to 1. Initially, if the quantity of water is insufficient to form an oil-in-water emulsion, this is not critical to the formation of the desired final product.

Distillation of the solvent may be accomplished in any conventional distillation manner, that is, by utilizing a jacketed vessel and applying heat to the periphery thereof or by steam distillation. The distillation may be carried out at normal atmospheric pressure, super-atmospheric pressure, or sub-atmospheric pressure, whichever is most convenient to the particular combination of materials being employed.

Agitation generally is desirable to prevent stratification and ensure maximum heat transfer but is not critical nor necessary to the practice of the invention until the ratio of the organic solvent to the polymer has reached between about 3 to 1 and about 2 to 1 by weight. At this stage of the distillation the ultimate particle size of the product is determined. If an extremely small generally dust-like product is desired, the entire dispersion should be subjected to violent agitation such as that obtained from rapidly rotating high shear agitators and the like; however, if larger particles are desired, the agitation should be proportionally less severe. The agitation should be provided for a sufficient period of time at this stage to thoroughly treat the dispersion and assure that some uniformity of dispersion has been obtained before more organic material is removed by distillation. By means of varying the agitation at this critical stage, particles ranging in size from dust to about ¼ inch pea-size are readily obtained. Once the ratio of organic material to polyolefin has been reduced to less than about 2 to 1, the agitation is no longer critical and may be reduced or increased within reasonable limits without affecting the particle size. Obviously, if a large particle material were desired and the mixture subjected to extremely high shear, mechanical damage and/or deformation of the particles would occur. If agitation is not employed in the critical range of polymer to solvent ratio between about 1:2 and 1:3 a very irregular product is obtained containing many large lumps. Distillation is continued until the organic material has been substantially removed from the mixture and the polymer dispersion in the form of generally spherical particles can be recovered by conventional means such as filtering, centrifugation, settling, decantation and the like.

In certain instances where materials are to be intimately admixed with the polyolefin polymer advantageously they are incorporated within the organic dispersion or solution. Such materials as pigments, dyes, stabilizers and the like water-insoluble materials may be intimately admixed within the polymer in the process of the invention if desired.

By way of further illustration, a graft polymer of polyethylene and acrylic acid is prepared in the following manner. A reaction vessel was charged with 1000 parts of toluene, 200 parts of freshly irradiated polyethylene which had beeen subjected to irradiation by a cobalt 60 source until a total dosage of 1.5 megareps had been absorbed by the polyethylene. 2.4 parts of acrylic acid were added to the mixture. The mixture vessel was closed, agitated and heated. The vessel and contents were heated to a temperature of 130° centigrade for a period of 45 minutes. At this time the contents of the reaction vessel were added to 3000 parts of water at a temperature of about 83° centigrade. The temperature of the resultant water, toluene, polyethylene graft polymer mixture was about 90° centigrade. The mixture was maintained at about this temperature and toluene azeotropically distilled until 400 parts of toluene had been removed from the distillation vessel. Agitation at this point was adjusted to provide a droplet, which on removal of the toluene, would form a particle of about 0.2 of a millimeter in diameter. This agitation was maintained and the remaining 500 parts of toluene was azeotropically distilled from the dispersion. The polymer was then separated from the dispersion by means of a centrifugate having a perforate basket. The polymer had a relatively uniform particle diameter of about 0.2 of a millimeter. The procedure of the foregoing illustration was repeated with the exception that the agitation was varied to give relatively uniform particles having diameters from about 50 microns to about 8 millimeters in diameter. Utilizing the foregoing procedures, with quantities of acrylic acid varying down to 1 percent, similar commensurated results are obtained.

Polypropylene-acrylic acid graft polymer treated in a similar manner dispersed in hot hexane and in the absence of acrylic acid is also formed into relatively uniform particles utilizing the hereinbefore outlined procedure.

In a manner similar to the foregoing illustrations resinous copolymers, and graft copolymers of ethylene, propylene, butylene, as well as graft copolymers formed on such polyolefin substrates are readily prepared in particulate form utilizing hydrophobic solvents such as toluene, xylene, benzene, perchloroethylene, carbon tetrachloride, hexane, heptane, octane and oleic. When subjected to suitable agitation when the ratio of the organic solvent to the polymer is from about 2 to 1 to about 3 to 1 the organic material is being removed by distillation.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method for the preparation of polyolefin-acrylic acid graft copolymer granular particles, the steps of the method comprising
providing a dispersion of a solvated polyolefin-acrylic acid graft copolymer wherein the polyolefin is a polymer of monoolefinic non-aromatic aliphatic hydrocarbons containing from 2 to 6 carbon atoms in an organic medium wherein the ratio of copolymer to organic medium is less than of about 1:3;
admixing said dispersion with water,
distilling from the water-organic-polymer dispersion the organic solvent until the organic solvent is present in a ratio of from about 2 to about 3 parts of solvent by weight per part of polymer;
agitating the water-organic-polymer dispersion to disperse the organic material within the water in a substantially uniform manner wherein each of the droplets of the organic material contains a quantity of polyolefin graft copolymer that is desired in the final individual particle;
distilling from the water-organic-polymer dispersion the remaining portion of the organic material and maintaining agitation until the ratio of the organic material to the polyolefin is less than 2:1 by weight, subsequently recovering granular graft copolymer particles.

2. The method of claim 1, wherein said copolymer is polyethylene-acrylic acid graft copolymer.

3. The method of claim 2, wherein said organic material is xylene.

4. The method of claim 3, wherein said admixing and distillation is carried out within a temperature range of from about 110° centigrade to 200° centigrade.

5. The method of claim 1, wherein said graft copolymer is a graft copolymer of polypropylene and acrylic acid.

References Cited by the Examiner

UNITED STATES PATENTS

| 2,970,129 | 1/1961 | Rugg et al. | 260—29.6 |
| 2,969,347 | 1/1961 | Bellinger et al. | 260—94.9 |
| 3,005,812 | 10/1961 | Wohlers | 260—94.9 |
| 3,056,772 | 10/1962 | Wallace | 260—94.9 |
| 3,125,462 | 3/1964 | Rachinsky | 260—878 |
| 3,154,530 | 10/1964 | Mullen | 260—94.9 |
| 3,162,697 | 12/1964 | Canterino | 260—878 |
| 3,177,269 | 4/1965 | Nowak et al. | 260—878 |

FOREIGN PATENTS

| 860,993 | 2/1961 | Great Britain. |

MURRAY TILLMAN, *Primary Examiner.*

SAMUEL H. BLECH, *Examiner.*

W. L. BASCOMB, D. J. BREZNER, *Assistant Examiners.*